(12) United States Patent
Biniguer

(10) Patent No.: US 8,045,986 B2
(45) Date of Patent: Oct. 25, 2011

(54) CELL SELECTION DEVICE FOR WIRELESS COMMUNICATION EQUIPMENT

(75) Inventor: Thierry Biniguer, Le Mans (FR)

(73) Assignee: ST-Ericsson SA, Geneva (CH)

( * ) Notice: Subject to any disclaimer, the term of this patent is extended or adjusted under 35 U.S.C. 154(b) by 674 days.

(21) Appl. No.: 11/915,473

(22) PCT Filed: May 16, 2006

(86) PCT No.: PCT/IB2006/051524
§ 371 (c)(1),
(2), (4) Date: Oct. 20, 2008

(87) PCT Pub. No.: WO2006/126137
PCT Pub. Date: Nov. 30, 2006

(65) Prior Publication Data
US 2009/0082018 A1    Mar. 26, 2009

(30) Foreign Application Priority Data
May 25, 2005   (EP) .................................. 05300413

(51) Int. Cl.
*H04W 4/00* (2009.01)

(52) U.S. Cl. .................. 455/435.2; 455/435.1; 455/446; 455/436; 455/422.1; 455/452.2; 370/331; 370/329; 370/332

(58) Field of Classification Search ............... 455/446, 455/450, 550.1, 552.1, 435.2, 435.1, 436, 455/422.1, 452.2, 452.1; 370/331, 332, 329
See application file for complete search history.

(56) References Cited

U.S. PATENT DOCUMENTS

| | | | | |
|---|---|---|---|---|
| 2004/0192313 | A1* | 9/2004 | Otting | 455/446 |
| 2006/0058034 | A1* | 3/2006 | Vaittinen et al. | 455/450 |
| 2010/0278146 | A1* | 11/2010 | Aoyama et al. | 370/331 |
| 2011/0136489 | A1* | 6/2011 | Funnell et al. | 455/436 |

* cited by examiner

*Primary Examiner* — Ajit Patel
*Assistant Examiner* — Khai M Nguyen
(74) *Attorney, Agent, or Firm* — William J. Kubida; Peter J. Meza; Hogan Lovells US LLP

(57) ABSTRACT

A cell selection device (D) is dedicated to a piece of wireless communication equipment (MS) arranged to establish radio communications with a radio communication network comprising radio communication cells and to receive data representative of the cell environment and of service capabilities of each cell of this environment from the network. This device (D) comprises a control means (CM) arranged, when its equipment (MS) needs to access a chosen network service, to access the data received by the equipment (MS) and representative of the cell environment and the corresponding cell service capabilities, to determine whether there is at least one cell in this environment that allows to access the network service, and to order the equipment (MS) either to pursue or to establish a radio communication with the network via a selected one of these determined cells if the selected cell allows at least one chosen radio parameter criterion to be satisfied.

12 Claims, 1 Drawing Sheet

CELL SELECTION DEVICE FOR WIRELESS COMMUNICATION EQUIPMENT

FIELD OF THE INVENTION

The present invention relates to the domain of radio communication networks, and more precisely to the accessibility of pieces of wireless communication equipment to different network services.

BACKGROUND OF THE INVENTION

Wireless communication equipment is here meant to be understood as a type of equipment arranged to establish radio communications with a radio communication network, and notably the mobile phones and the personal digital assistants (PDAs) or laptops that are provided with a radio communication device. These pieces of equipment are often named mobile station (MS) or user equipment (UE).

Nowadays more and more communication standards coexist or are about to coexist in a same network or in networks that are connected to one another. Among these standards may notably be cited the 2 G standard (such as GSM), the 2.5 G standard (such as GPRS), the 2.75 G standard (such as EDGE), and the 3 G standard (such as UMTS).

The transition from one standard to another may be an "easy" task when equivalent technologies are concerned. This is notably the case of the transition from the 2 G standard to the 2.5 G standard. These standards effectively use a same type of modulation (GMSK) so that the transition mainly requires to update the base stations (of the radio access network) with a new software release.

But when a new standard uses either a new modulation (such as the 8 PSK in case of EDGE) or a new radio access mode (as it is the case in UMTS), the transition is much more complex and costly. For instance the transition from GPRS to EDGE requires to update the base stations (BTSs) and the base station controllers (BSCs) of the radio access network both with new software and hardware releases. Therefore, the update of a whole network can take several years during which the cells which are associated with a GPRS base station will not be able to offer the radio access to the network services (for instance high throughput or high data bit rate) which is offered by the cells associated with an EDGE base station to the pieces of wireless communication equipment connected to them. The transition from GPRS or EDGE to UMTS is still more complex because it requires a new network deployment.

This situation penalizes the users of pieces of wireless communication equipment which offer a multimode working such as GSM/GPRS/EDGE modes or even GSM/GPRS/EDGE/UMTS modes (through two radio communication sub-systems).

Effectively, as is known by the man skilled in the art, a piece of wireless communication equipment is arranged to select the cell through which it accesses a network depending on the level of a radio parameter of the downlink signals (generally the BCCH carrier) it receives from the surrounding cells. In other words, a piece of wireless communication equipment selects the cell which momentarily offers the highest radio parameter level in order to reliably decode downlink signals and have the highest probability of uplink communication. Therefore, an EDGE or UMTS cell may be "hidden" by a GPRS cell which momentarily offers a better radio parameter level, thus forbidding equipment users to access the EDGE or UMTS network services.

So, the object of this invention is to improve the situation.

SUMMARY OF THE INVENTION

For this purpose, it provides a cell selection device for a piece of wireless communication equipment arranged to establish radio communications with a radio communication network comprising radio communication cells and to receive from the network data representative of the equipment cell environment and of the service capabilities of each cell of this environment.

This cell selection device is characterized in that it comprises a control means arranged to access the data received by its equipment and representative of its cell environment and the corresponding cell service capabilities, when its equipment needs to access a chosen network service, to determine whether it exists at least one cell in this environment that allows to access the chosen network service, and orders its equipment either to pursue or establish a radio communication with the network via a selected one of these determined cells if this selected cell allows at least one chosen radio parameter criterion to be satisfied.

The cell selection device according to the invention may include additional characteristics considered separately or in combination, and notably:

- the radio parameter may be the carrier level (for instance the BCCH one);
- the radio parameter may be the re-selection parameters C1 and C2 (which are defined by the 3GPP specification TS 05.08 V8.19.0 (2003-11) chapter 6.4) including the carrier level. In this case the control means is arranged to compare the value C2s of the parameter C2 of the cell in which its mobile phone is located to each corresponding value C2ni of each neighboring cell offering the chosen network service, and then, if the value C2s each value C2ni added to a chosen threshold, and if the value C1s of the parameter C1 of the cell in which its mobile phone is located exceeds 0, to select the neighbouring cell (ni) which offers the best value C2ni;
- the control means may be arranged to store the data (received by its equipment and representative of its cell environment and the corresponding cell service capabilities) and the associated radio parameters in a memory means;
- the control means may be arranged to be set up to carry out a cell selection for a chosen designated network service chosen from a group of at least two network services;
- the control means may be arranged to carry out a cell selection for a chosen designated network service;
- the designated network service may be defined by a user profile;
- the control means may be arranged to automatically carry out a cell selection for one chosen network service;
- the network services may be supported by the GPRS standard and the EDGE and/or UMTS standard(s).

The invention also provides a piece of wireless communication equipment comprising a cell selection device such as the one introduced above.

Such equipment may be a mobile phone, for instance. Moreover this equipment may comprise a man/machine interface (MMI) coupled to its cell selection device and comprising a menu in which a user can navigate to enable or disable the cell selection device. This menu may also be arranged to allow the user to set up the cell selection device.

BRIEF DESCRIPTION OF THE DRAWINGS

Other features and advantages of the invention will become apparent on examining the detailed specifications hereafter and the appended drawings, wherein.

DESCRIPTION OF PREFERRED EMBODIMENTS

The invention aims at offering a cell selectivity to a piece of wireless communication equipment depending on a required network service offered by a radio communication network (release 99 (R99) and the following releases).

In the following description it will be considered that the wireless communication equipment is a mobile phone, for instance a dual mode GPRS/EDGE phone. But the invention is not limited to this kind of equipment. It may also be a multimode GSM/GPRS/EDGE/UMTS phone, or a laptop or PDA (Personal Digital Assistant) comprising a communication device, for instance.

A radio communication network, such as a GPRS/EDGE one, can be summed up in a schematic way, but sufficient to the understanding of the invention, to a core network coupled to a radio access network (or BSS).

The radio access network comprises base stations (or BTSs) and radio network controllers (or RNCs), connected in between via a private transport network.

Each base station (or BTS) is associated with a cell covering a radio zone in which mobile phones may establish or pursue radio communications.

A radio network controller (or RNC) is arranged to control at least one base station. The radio network controllers (or RNCs) are mainly in charge of the resource allocation management so that network services may be established between the mobile phone and the core network through the base stations they respectively control.

A network service is for instance a connexion (or link), which can be used to transmit data between the core network and a mobile phone. Among the numerous network services requiring a high throughput one can cite the MMS (Multimedia Messaging Service), the video-streaming, the Internet access, the television (TV) on mobile and the MPEG melody download.

Figure 1:
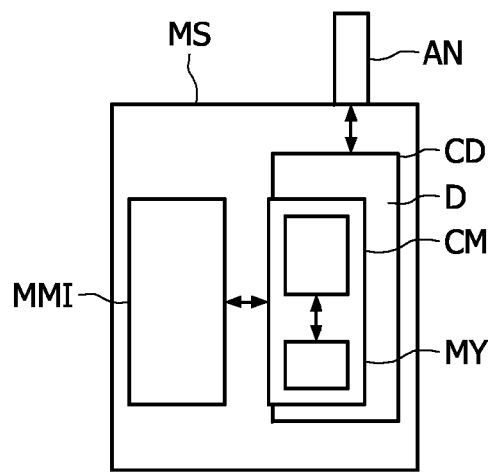
FIG. 1 schematically illustrates a mobile phone comprising an example of embodiment of a cell selection device according to the invention, and FIG. 2 schematically illustrates an example of a cell selection algorithm which can be implemented in a piece of wireless communication equipment according to the invention.

As it is schematically illustrated in FIG. 1, a mobile phone MS comprises an antenna AN coupled to a communication device (or module) CD arranged to establish radio communications with the mobile network via its radio access network in order to exchange data. In the example described the communication device CD is adapted both to GPRS and EDGE standards. Therefore, it can offer access to the GPRS or EDGE network services when it has established a communication with the mobile network, via a GPRS or EDGE cell.

The communication device CD is notably arranged to receive data, representative of its mobile phone cell environment and of the service capabilities of each cell of this environment, from the radio access network.

The data representative of the mobile phone cell environment are periodically broadcast on the air interface by the base stations (BTs) through a logical channel named Broadcast Control Channel (BCCH). These data describe the cells which surround the one in the radio coverage of which a mobile phone MS is located.

The data representative of the cell service capabilities are also broadcast on the air interface by the base stations (BTs) through the logical channel BCCH in agreement with the 3GPP specification TS 44.018 V4.15.1 (2003-12). This data broadcasting is generally performed periodically, every 30 seconds. The broadcast data describe the GPRS and EDGE cell options and especially indicate which cell supports the GPRS or EDGE services as indicated in table 9.1.43a.1/3 of the above mentioned 3GPP specification, and more precisely in its last field of Information element "SI 13 Rest Octets" (described in table 10.5.2.37b.1 of TS 44.018 and coded according to the syntax specified in TS 44.060 V4.14.0 (2003-12)).

In order for a mobile phone MS be able to access a chosen network service when it is necessary, the invention proposes a cell selection device D.

This device D comprises at least a control module CM, which intervenes each time the mobile phone MS needs to access a chosen network service. Therefore it is preferably integrated with the communication device CD, and for instance with the radio resource layer which is in charge of the establishment of the communication.

This control module CM is arranged to access the cell environment data and the corresponding cell service capability data (hereafter named "cell information data"), that are received by the communication device CD, to determine whether it exists one or more cells into the mobile phone environment which allow(s) to access a chosen network service. If this happens, the control module CM orders the communication device CD either to pursue or to establish the radio communication with the network via a selected one of the cells it has just determined. The selected cell is one of the determined cells, which allows at least one chosen radio parameter criterion to be satisfied.

In other words the cell, which is selected by the control module CM and must be used by the mobile phone MS to access a chosen network service, is a surrounding cell which both offers access to this chosen network service and satisfies the criterion (or criteria).

So, to select a cell, the control module CM may start by determining each surrounding cell offering access to the chosen network service and then selecting the one that satisfies the criterion best. In a variant the control module CM may start by determining each surrounding cell satisfying the criterion and then selecting the one that also offers access to the chosen network service (in case where at least two cells offer this access one preferably selects the one that satisfies the criterion best).

The radio parameter may be the traditional re-selection parameters C1 and C2 (which are defined by the 3GPP specification TS 05.08 V8.19.0 (2003-11) chapter 6.4) including the level of the carrier which is used by the base stations of the surrounding (or neighbouring) cells to transmit their cell information data. For instance one can use the BCCH carrier level. But this is not mandatory. Indeed, one can use any kind of radio criterion (CR) computed by the mobile phone MS.

When the control module CM uses the re-selection parameters C1s and C2s (computed by the communication device CD) as radio parameter of a (serving) cell s in which its mobile phone MS is located, it determines the C2ni corresponding to the i neighbouring cells ni (for instance i=1 to 6). Then, if for each neighbouring cell ni offering the chosen service (for instance the EDGE service) C2s>2ni+Threshold, and if in the same time C1s exceeds 0 (C1s>0), the control module CM selects the cell ni which offers the best C2ni.

Figure 2:
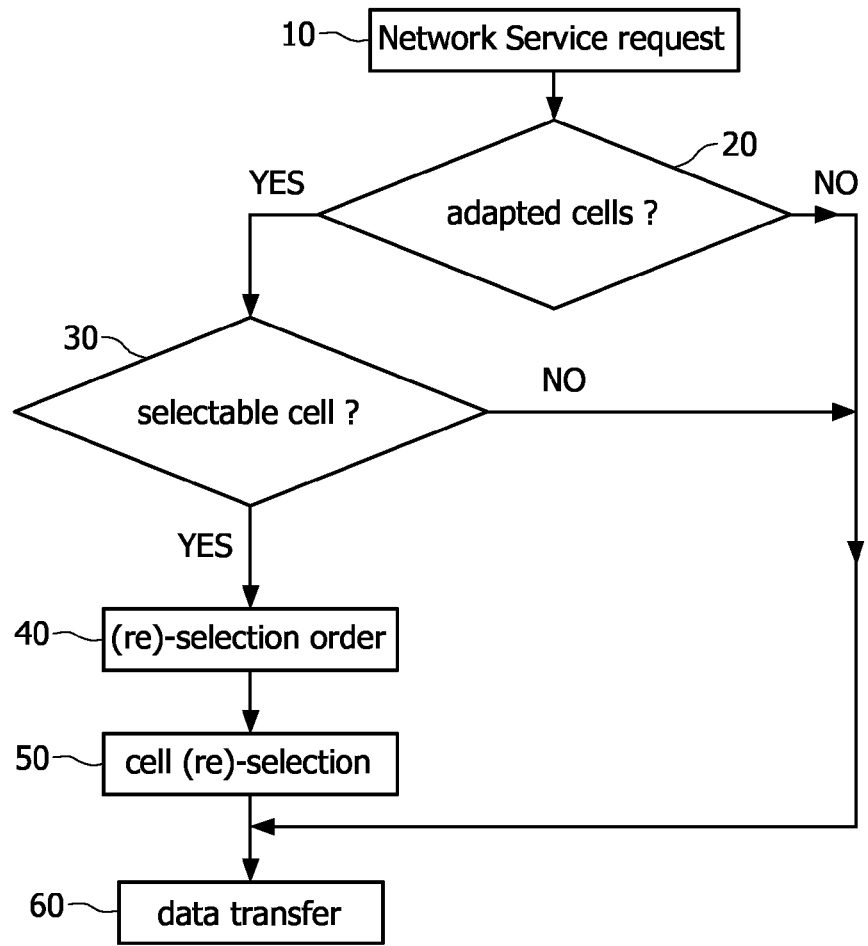

The control module CM may be arranged to store the cell information data, which are received by the communication device CD and are useful to its cell selections, and the associated radio parameter in a memory MY. Any kind of memory means may be envisaged. As is illustrated in FIG. 2, this memory MY may be a part of the cell selection device D. But in a variant this memory MY could be a part of the communication device CD.

The cell information data and the corresponding radio parameter may be automatically fed to the cell selection device D by the communication device CD each time it receives them.

Such a memory MY facilitates the cell selection by the control module CM because it only has to access this memory MY to determine the cell information data when a cell selection is required. Without this memory MY, the control module CM would have to wait for the communication device CD to have received the broadcast cell information data before carrying out a required cell selection.

FIG. 2 schematically illustrates an example of a cell selection algorithm which can be implemented by the device D according to the invention in a piece of wireless communication equipment MS. This cell selection is based on the above mentioned comparison of the received BCCH carrier levels, but another radio parameter criterion could be used.

In step 10, since the current cell s does not offer a chosen network service, the communication device CD orders the device D to proceed to the selection of a cell (ni) offering access to this chosen network service.

In a step 20 the control module CM determines from the cell information data (for instance stored into the memory MY) each surrounding cell that is able to offer access to the chosen network service.

If the control module CM does not find any cell able to offer access to the chosen network service, the control module CM informs the communication device CD that no neighbor cell is available to provide access to the chosen network service. Then the algorithm goes directly onto step 60 in which the communication device CD either pursues the radio communication in progress via the cell to which it is connected, or establishes a radio communication via the cell that offers the best BCCH carrier level. In both cases the mobile phone MS cannot access the chosen network service.

Now, if the control module CM finds one or more cells able to offer access to the chosen network service, then it goes on to step 30 to determine if one of these cells satisfies the radio parameter criterion. Here the radio parameter is supposed to be the BCCH carrier level (but this is only an example).

If none of these cells satisfies the radio parameter criterion, the control module CM informs the communication device CD that no neighbor cell is available to provide access to the chosen network service. Then the algorithm goes directly on to step 60 in which the communication device CD either pursues the radio communication in progress via the cell to which it is connected, or establishes a radio communication via the cell that offers the best BCCH carrier level. In both cases the mobile phone MS cannot access to the chosen network service.

If the control module CM finds one or more cells which satisfy(ies) the criterion, it selects the one that satisfies this criterion best and then goes to step 40.

In step 40 the control module CM orders the communication device CD either to pursue or to establish the radio communication with the network via the cell selected in step 30.

Then in step 50 the communication device CD either proceeds to the establishment of a new communication with the network via the selected cell, or proceeds to the transfer of the communication in progress to the selected cell.

Then the algorithm ends in step 60 in which the communication device CD either pursues the radio communication in progress or starts a radio communication via the selected cell, in order to transfer data by means of the chosen network service.

The network service to which the mobile phone MS wants to access may either be chosen by the user or by the mobile phone MS (taking into account the user needs, possibly defined by a user profile) or be predetermined.

Indeed the control module CM may be set up to carry out a cell selection of a network service, designated by the mobile phone MS (for instance its communication device CD), from several network services.

In a first variant the designated network service may be designated by a user profile defined by the user and stored in the mobile phone MS (possibly in memory MY). In this case the control module CM is set up to automatically carry out a cell selection for the (chosen) predetermined network service designated by the user profile.

For the user to define the user profile, the mobile phone MS may comprise a man/machine interface MMI. In this case the man/machine interface MMI comprises a menu with an item dedicated to the user profile definition.

In a second variant the control module CM may be set up to carry out a cell selection of a network service designated by the user. To this effect the mobile phone MS may use the above mentioned man/machine interface (My. But the latter needs to be coupled to the cell selection device D and comprises a menu item dedicated to the cell selection device set up by the user.

The menu may also comprise another dedicated item allowing the user to enable or disable the cell selection device D. In the enable mode the cell selection device D automatically proceeds to a cell selection each time the mobile phone MS requires so. In the disable mode the cell selection device D is not allowed to proceed to cell selections. Therefore, the communication device CD works classically.

The cell selection device D, and more precisely its control module CM and possibly its memory MY, may be (part of) an integrated circuit (for instance an ASIC) realized in any technology used in chip manufacturing. But it may also be implemented as software, or as a combination of hardware and software modules.

The invention is not limited to the embodiments of cell selection device and wireless communication equipment described above, only as examples, but it encompasses all alternative embodiments which may be considered by one skilled in the art within the scope of the claims defined hereafter.

The invention claimed is:

1. Cell selection device for a piece of wireless communication equipment arranged to establish radio communications with a radio communication network comprising radio communication cells, and to receive data representative of a cell environment and of service capabilities of each cell of said environment from said network, characterized in that it comprises a control means arranged to access the data received by said equipment and representative of the cell environment and the corresponding cell service capabilities, when said equipment (MS) needs to access a chosen network service, to determine whether there is at least one cell in said environment that allows to access said network service, and orders said equipment either to pursue or to establish a radio communication with said network via a selected one of these determined cells if said selected cell allows at least one chosen radio parameter criterion to be satisfied, wherein said radio parameter comprises re-selection parameters C1 and C2, and in that said control means is arranged to compare a value C2s of the parameter C2 of the cell in which said mobile phone is located to each corresponding value C2ni of each neighboring cells offering said chosen network service, and then, if said value C2s exceeds each value C2ni added to a chosen threshold and if the value C1s of the parameter C1 of the cell in which said mobile phone is located exceeds 0, to select the neighboring cell that offers the best value C2ni.

2. Cell selection device according to claim 1, characterized in that said radio parameter is a carrier level.

3. Cell selection device according to claim 2, characterized in that said carrier level is a BCCH carrier level.

4. Cell selection device according to claim 1, characterized in that said control means is arranged to store said data, received by said equipment and representative of the cell environment and cell service capabilities, and the associated radio parameters into a memory means.

5. Cell selection device according to claim 1, characterized in that said control means is arranged to be set up to carry out a cell selection for a designated network service chosen in a group of at least two network services.

6. Cell selection device according to claim 1, characterized in that said control means is arranged to carry out a cell selection for a chosen designated network service.

7. Cell selection device according to claim 1, characterized in that said control means is arranged to automatically carry out a cell selection for one chosen network service.

8. Cell selection device according to claim 6, characterized in that said chosen network service is defined by a user profile.

9. Cell selection device according to claim 1, characterized in that said network services are supported by the GPRS standard and the EDGE and/or UMTS standard(s).

10. Wireless communication equipment for a radio communication network comprising radio communication cells, comprising a cell selection device according to claim 1.

11. Wireless communication equipment according to claim 10, characterized in that it comprises a man/machine interface coupled to said cell selection device and comprising a menu in which a user can navigate to enable or disable said cell selection device.

12. Wireless communication equipment according to claim 11, characterized in that said menu is arranged to allow said user to set up said cell selection device.

* * * * *